United States Patent [19]
Cox et al.

[11] Patent Number: 6,108,434
[45] Date of Patent: *Aug. 22, 2000

[54] COUNTERACTING GEOMETRIC DISTORTIONS FOR DCT BASED WATERMARKING

[75] Inventors: Ingemar J. Cox, Lawrenceville; Matthew L. Miller, Princeton, both of N.J.

[73] Assignee: Signafy, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/928,576

[22] Filed: Sep. 12, 1997

[51] Int. Cl.$^7$ ........................................... G06K 9/00
[52] U.S. Cl. ............................................... 382/100
[58] Field of Search ................... 382/232, 233, 382/100, 295, 275, 289, 296; 380/54

[56] References Cited

U.S. PATENT DOCUMENTS

| | | | |
|---|---|---|---|
| 4,939,515 | 7/1990 | Adelson | 341/51 |
| 5,319,735 | 6/1994 | Preuss et al. | 395/2.14 |
| 5,530,751 | 6/1996 | Morris | 380/4 |
| 5,530,759 | 6/1996 | Braudaway et al. | 380/54 |
| 5,568,570 | 10/1996 | Rabbani | 382/238 |
| 5,613,004 | 3/1997 | Cooperman et al. | 380/28 |
| 5,636,292 | 6/1997 | Rhoads | 382/232 |
| 5,646,997 | 7/1997 | Barton | 380/23 |
| 5,659,726 | 8/1997 | Sandford, II et al. | 395/612 |
| 5,664,018 | 9/1997 | Leighton | 380/54 |
| 5,687,236 | 11/1997 | Moskowitz et al. | 380/28 |
| 5,710,834 | 1/1998 | Rhoads | 382/232 |

FOREIGN PATENT DOCUMENTS

| | | |
|---|---|---|
| 0690595 | 1/1995 | European Pat. Off. . |
| 2196167 | 4/1988 | United Kingdom . |
| 8908915 | 9/1989 | WIPO . |
| 9520291 | 7/1995 | WIPO . |
| 9621290 | 7/1996 | WIPO ............................. H04H 1/00 |
| 9625005 | 8/1996 | WIPO ............................. H04N 7/08 |
| 9627259 | 9/1996 | WIPO . |

OTHER PUBLICATIONS

Wolfram Szepanski, "A signal theoretic method for creating forgery–proof documents for automatic verification", Proceedings 1979 Carnahan Conference on Crime Countermeasures, pp. 101–109, May 16–18, 1979.

R.G. Van Schyndel et al, "A digital watermark," in Intl. Conf. On Image Processing, vol. 2, pp. 86–90, 1994.

G. Caronni, "Assuring Ownership Rights for Digital Images," in Proc. Reliable IT Systems, VIS '95, 1995.

J. Brassil et al, "Electronic Marking and Identification Techniques to Discourage Document Copying," in Proc. Infocom '94, pp. 1278–1287, 1994.

K. Tanaka et al, "Embedding Secret Information into a Dithered Multi–level Image," in IEEE Military Comm. Conf., pp. 216–220, 1990.

(List continued on next page.)

*Primary Examiner*—Leo H. Boudreau
*Assistant Examiner*—Dmitry A. Novik
*Attorney, Agent, or Firm*—Philip J. Feig

[57] ABSTRACT

Detection of a watermark in blocks of video or image data which has been subjected to affine geometric distortion is accomplished by approximating the distortion by a spatially varying translation of the blocks. The watermark is extracted by spatial translations of the blocks based on an assumed affine geometric distortion. The extracted watermarks are correlated with possible watermarks and the maximum correlator output is tested for statistical significance in order to determine whether a watermark is present in the image or video frame. The data may be compressed or uncompressed data. If the affine geometric distortion is known, a search for the maximum correlator output over a space of possible distortions can be performed.

24 Claims, 5 Drawing Sheets

OTHER PUBLICATIONS

K. Mitsui et al, "Video–Steganography: How to Secretly Embed a Signature in a Picture," in IMA Intellectual Property Project Proc., vol. 1, pp. 187–206, 1994.

Macq and Quisquater, "Cryptology for Digital TV Broadcasting," in Proc. of the IEEE, vol. 83, No. 6, pp. 944–957, 1995.

W. Bender et al, "Techniques for data hiding," in Proc. of SPIE, vol. 2420, No. 40, Jul. 1995.

Koch, Rindfrey and Zhao, "Copyright Protection for Multimedia Data," in Proc. of the Int'l Conf. on Digital Media and Electronic Publishing (Leeds, UK, Dec. 6–8, 1994).

Koch and Zhao, "Towards Robust and Hidden Image Copyright Labeling," in Proc. of 1995 IEEE Workshop on Nonlinear Signal and Image Processing (Neos Marmaras, Halkidiki, Greece, Jun. 20–22, 1995.

Zhao and Koch, "Embedding Robust Labels Into Images For Copyright Protection," in Proc. Int. Congr. on IPR for Specialized Information, Knowledge and New Technologies (Vienna, Austria), Aug. 21–25, 1995.

"Digital Copyright: Who Owns What?" NewMedia, Sep. 1995, pp. 38–43.

"Publish and Be Robbed?" New Scientist, Feb. 18, 1995, pp. 32–37.

Kohno et al, "Spread Spectrum Access Methods for Wireless Communications," in IEEE Communications Magazine, Jan. 1995, pp. 58–67, I16.

Campana and Quinn, "Spread spectrum communications," in IEEE Potentials, Apr. 1993, pp. 13–16.

Mowbray and Grant, "Wideband coding for uncoordinated multiple access communication," in Electronics & Communication Engineering Journal, Dec. 1992, pp. 351–361.

Digimarc Overview & "Wired" Magazine article (Jul. 1995 issue)–Jun. 1995.

A.G. Bors et al., "Image Watermarking Using DCT Domain Constraint", Dept. Of Informatics, University of Thessaloniki.

I.J. Cox et al., "Secure Spread Spectrum Watermarking for Multimedia", NEC Research Institute, Technical Report 95-10.

H.S. Stone, "Analysis of Attacks on Image Watermarks with Randomized Coefficients", NEC Research Institute, May 17, 1996.

F.M. Boland et al., "Watermarking Digital Images for Copyright Protection", Image Processing and its Applications, Jul. 4–6, 1995, Conference Publication No. 410, pp. 326–330.

L. Boney et al., "Digital Watermarks for Audio Signals".

Swanson et al., "Transparent Robust Image Watermarking", Proc. IEEE Int. Conf. On Image Proc. 1996.

J.J.K. O Ruanaidh et al., "Phase Watermarking of Digital Images".

I. Pitas, "A Method for Signature Casting on Digital Images".

C.T. Hsu et al., "Hidden Signatures in Images", ICIP 96 Conf. Proc., Sep. 16–19, 1996.

M. Schneider et al., "A Robust Content Based Digital Signature for Image Authentication", ICIP 96 Conf. Proc., Sep. 16–19, 1996.

S. Roche et al., "Multi–Resolution Access Control Algorithm Based on Fractal Coding", ICIP 96 Conf. Proc., Sep. 16–19, 1996.

K. Hirotsugu, "An Image Digital Signature System with ZKIP for the Graph Isomorphism", ICIP 96 Conf. Proc., Sep. 16–19, 1996.

R.B. Wolfgang et al., "A Watermark for Digital Images".

J.J.K. O Ruanaidh et al., "Watermarking Digital Images for Copyright Protection", EVA 96 Florence, pp. 1–7.

T. Aura, "Invisible Communication", Nov. 6, 1995.

D. Kahn, "Information Hiding—An Annotated Bibliography", Macmillan 1967, Library of Congress catalog No. 63–16109.

Craver et al., "Can Invisible Watermarks Resolve Rightful Ownership?", IBM Research Report.

Podilchuk et al., "Digital Image Watermarking Using Visual Models", Proc. of EI'97, vol. 3016, Feb. 9–14, 1997.

Cox et al., "A review of watermarking and the importance of perceptual modeling", Proc. of EI'97, vol. 3016, Feb. 9–14, 1997.

Watson, "DCT quantization matrices visually optimized for individual images", SPIE, vol. 1913, pp. 202–216.

Ahumada, Jr. et al., "Luminance–Model–Based DCT Quantization for Color Image Compression", SPIE, vol. 1666 (1992), pp. 365–374.

Hartung et al., "Digital Watermarking of Raw and Compressed Video", Systems for Video Communication, Oct. 1996, pp. 205–213.

| SCALED | 1' | 2' | 3' | 4' | 5' | 6' | 7' | 8' | 9' | 10' |
|---|---|---|---|---|---|---|---|---|---|---|
| ORIGINAL | 1 | 2 | 3 | 4 | 5 | 6 | 7 | 8 | 9 | |

COUNTERACTING GEOMETRIC DISTORTIONS FOR DCT BASED WATERMARKING

FIELD OF THE INVENTION

The present invention relates to digital watermarking of multimedia data and particularly video data. More particularly, the invention concerns watermarking of compressed video data, such as JPEG and MPEG, and the detection of a watermark in compressed video that has been subject to geometric distortion.

BACKGROUND OF THE INVENTION

The proliferation of digitized media such as image, video and multimedia is creating a need for a security system which facilitates the identification of the source of the media. The expected introduction of digital video disks (DVD) in mass markets will further exacerbate the problem.

Content providers, i.e. owners of works in digital data form, have a need to embed signals into video/image/multimedia data, including audio data, which can subsequently be detected by software and/or hardware devices for purposes of authenticating copyright ownership, control and management.

There are systems for inserting a watermark into digital media and for extracting a watermark from watermarked media. Typical systems are described, for instance, in U.S. patent application Ser. No. 08/534,894, filed Sep. 28, 1995, entitled "Secure Spread Spectrum Watermarking for Multimedia Data", which is incorporated herein by reference, where spread spectrum watermarking by embedding a watermark signal in perceptually significant regions of an image for the purposes of identifying content owner and/or possessor. An articled entitled "Secure Spread Watermarking for Multimedia" by Cox et al available at http:www.neci.nj.nec.com/tr/index.html (Technical Report No. 95-110) describes spread spectrum watermarking which embeds a pseudo-random noise sequence into digital data for watermarking purposes.

The above watermark extraction methodology requires the original image spectrum be subtracted from the watermarked image spectrum. This restricts the use of the method when there is no original image or original image spectrum available to the decoder.

In U.S. Pat. No. 5,319,735 by R. D. Preuss et al entitled "Embedded Signaling" digital information is encoded to produce a sequence of code symbols. The sequence of code symbols is embedded in an audio signal by generating a corresponding sequence of spread spectrum code signals representing the sequence of code symbols. The frequency components of the code signal being essentially confined to a preselected signaling band lying within the bandwidth of the audio signal and successive segments of the code signal corresponds to successive code symbols in the sequence. The audio signal is continuously frequency analyzed over a frequency band encompassing the signaling band and the code signal is dynamically filtered as a function of the analysis to provide a modified code signal with frequency component levels which are, at each time instant, essentially a preselected proportion of the levels of the audio signal frequency components in corresponding frequency ranges. The modified code signal and the audio signal are combined to provide a composite audio signal in which the digital information is embedded. This component audio signal is then recorded on a recording medium or is otherwise subjected to a transmission channel. Two key elements of this process are the spectral shaping and spectral equalization that occur at the insertion and extraction stages, respectively, thereby allowing the embedded signal to be extracted without access to the unwatermarked original data.

In U.S. patent application Ser. No. 08/708,331, filed Sep. 4, 1996, entitled "A Spread Spectrum Watermark for Embedded Signaling" by Cox now U.S. Pat. No. 5,845,155, and incorporated herein by reference, there is described a method for extracting a watermark or embedded data from watermarked images or video without using an original or unwatermarked version of the data.

This method of watermarking an image or image data for embedding signals requires that the DCT (discrete cosine transform) and its inverse of the entire image be computed. There are fast algorithms for computing the DCT in N log N time, where N is the number of pixels in the image. However, for N=512×512, the computational requirement is still high, particularly if the encoding and extracting processes must occur at video rates, i.e. 30 frames per second. This method requires approximately 30 times the computation needed for MPEG-II decompression.

One possible way to achieve real-time video watermarking is to only watermark every $N^{th}$ frame. However, content owners wish to protect each and every video frame. Moreover, if it is known which frames contain embedded signals, it is simple to remove those frames with no noticeable degradation in the video signal.

An alternative option is to insert the watermark into n×n blocks of the image (subimages) where n<<N. If the block size is chosen to be 8×8, i.e. the same size as that used for MPEG image compression, then it is possible to tightly couple the watermark insertion and extraction procedures to those of the MPEG compression and decompression algorithms. Considerable computational saving can then be achieved since the most expensive computations relate to the calculation of the DCT and its inverse and these steps are already computed as part of the compression and decompression algorithm. The incremental cost of watermarking is then very small, typically less than five percent of the computational requirements associated with MPEG.

U.S. patent application Ser. No. 08/715,953, filed Sep. 19, 1996, entitled "Watermarking of Image Data Using MPEG/JPEG Coefficients" which is incorporated herein by reference, advances this work by using MPEG/JPEG coefficients to encode the image data.

U.S. patent application Ser. No. 08/746,022, filed Nov. 5, 1996, entitled "Digital Watermarking", now U.S. Pat. No. 5,915,027, which is incorporated herein by reference, describes storing watermark information into subimages and extracting watermark information from subimages.

A review of watermarking is found in an article by Cox et al., entitled. "A review of watermarking and the importance of perceptual modeling" in Proc. of EI'97, vol. 30–16, Feb. 9–14, 1997.

U.S. patent application Ser. No. 08/815,524, filed Mar. 12, 1997, entitled "Digital Watermarking", which is incorporated herein by reference, describes storing watermark images into the sum of all or a subset of all the subimages and extracting watermark information from subimages after the watermark from each subimage is combined together.

U.S. Provisional Patent Application Ser. No. 60/043,750, filed Apr. 9, 1997, which is incorporated herein by reference, further advances the art by providing simpler, more efficient and robust methods of inserting and detecting watermarks in digital data.

To allow for computationally efficient detection of the watermark in both the spatial and DCT domains, a watermark is inserted into sums of groups of 8×8 blocks in the DCT. The advantage of this approach is that, if the image is only available in the spatial domain, then the summation can also be performed in the spatial domain to compute a small number of 8×8 blocks and only these blocks must then be transformed into the DCT domain. This is because the sum of DCT blocks is equal to the DCT of the sum of spatial blocks. Since the computational cost of detecting watermarks is now dominated by the cost of summation, the cost of detecting in the DCT and spatial domains is approximately the same.

Although these watermarking techniques are highly successful, there is one problem remaining. Namely, even small geometric changes to an image or video frame significantly affects the DCT coefficients. For example, consider an image that is divided into 8×8 blocks and transformed into the frequency domain by computing the DCT of the blocks. If the image is now reduced in size by ⅛, then each original 8×8 pixel block is reduced to a set of 7×7 pixels. If the reduced or scaled image is again divided into 8×8 blocks and the corresponding DCTs of the blocks are calculated, these new DCT coefficients are usually very different from those of the original unscaled image. As a result, watermark detection often fails.

The present invention solves the problem of geometric scaling or affine distortion of images or video frames by approximating the scale change or distortion by a spatially varying translation of each 8×8 block. The image is divided into a disjoint set of blocks, each block within a set experiencing the same translation. The set of blocks is different for different sets. The watermark is extracted for all translations of the blocks and the maximum correlator output is tested for statistical significance in order to determine whether a watermark is present in the image or video frame.

SUMMARY OF THE INVENTION

A watermark algorithm divides an image or video data into 8×8 pixel blocks. The blocks are then apportioned among 38 groups. The watermark detection process begins by summing all 8×8 blocks in a group, thereby reducing the dimension of the data into 38 blocks of 8×8 values each. A subset of coefficients in each of the 8×8 blocks is further summed together to form a one-dimensional vector of length 38.

The 38 groups of 8×8 blocks of DCT coefficients are chosen in such a way that translation shifts of multiples of 8 pixels simply result in a cyclic rotation of the extracted 1-D watermark vector. For shifts that are not a multiple of 8, it is only necessary to determine the translation remainder modulo 8, i.e. translation of 0 to 7 pixels in both the x and y directions. This is accomplished by taking the 38-8×8 blocks of DCT coefficients and first transforming them to the spatial domain. Next, the data is shifted by one of the 64 possible translations before being transformed back to the DCT domain. The watermark is then extracted and tested as will be described below. The process is repeated for all translations and the maximum value of the correlator output is then tested for statistical significance in order to determine whether a watermark is present.

Since the amount of translation of the image or video frame is not known beforehand, by repeating the shift for all translations of 0 to 7 pixels, and then determining the signal with the highest correlation to a watermark, the most likely translation factor and watermark are determined.

The present invention approximates geometric distortions by spatially varying translations. While removing the change or distortion from the image or video data is extremely difficult, manipulation in the form of spatial translation of blocks is a relatively simple way to extract a watermark from the distorted image or video, without restoring the image or video to its original, undistorted condition.

A principal object of the present invention is therefore, the provision of a watermark detection method which corrects for affine distortion of the watermarked data, such as image or video data.

Further objects of the invention will become more clearly apparent when the following description is read in conjunction with the accompanying drawing.

DETAILED DESCRIPTION

As used in the following description the terms image, image data, video, video frame and video data will be understood to apply equally to video, image and multimedia data. The term "watermark" will be understood to include embedded data, symbols, images, instructions or any other identifying information.

A significant problem in designing a watermarking system and particularly for DVD applications is to insert watermarks that are easy to detect in both MPEG compressed and uncompressed video. Most watermarks can be easily detected in either the spatial (uncompressed) or the DCT (compressed) domains, but not both. This means that detecting the watermarks in one or the other domain requires conversion of the entire image, which is generally too computationally expensive for DVD applications. In the following description, it is assumed that a watermark was inserted into the video data in a conventional manner, for example in a manner described in patent applications and publications cited above.

A solution to the problem is to insert the watermark in such a way that it can be extracted from a small number (or groups) of 8×8 blocks, preferably 38 groups. Each group is the sum of many blocks in the image. If 8×8 blocks in the spatial domain are added together in a group, and then the DCT of the sum is computed, it is the equivalent of computing the DCT of each block and adding the DCTs together. The DCT of the sum of the 8×8 blocks in a group in the spatial domain is the equivalent of the sum of the DCT of each 8×8 block in the group. The result is that the 38 summed blocks can be computed directly from either uncompressed or MPEG encoded data, with conversion into the spatial or compressed domain being performed only after the summation is performed. Thus, rather than computing 5400 DCT coefficients, only 38 DCTs are computed.

The size of blocks is preferably selected to be 8×8 because of the structure of common MPEG video signals. However, the invention is applicable to any n×n block. The number of groups arbitrarily is selected to be 38. The invention can use other quantities of groups of blocks. Therefore, in the following description when reference is made to 38 items, it will be understood that any predetermined number of items could be used.

Figure 1:
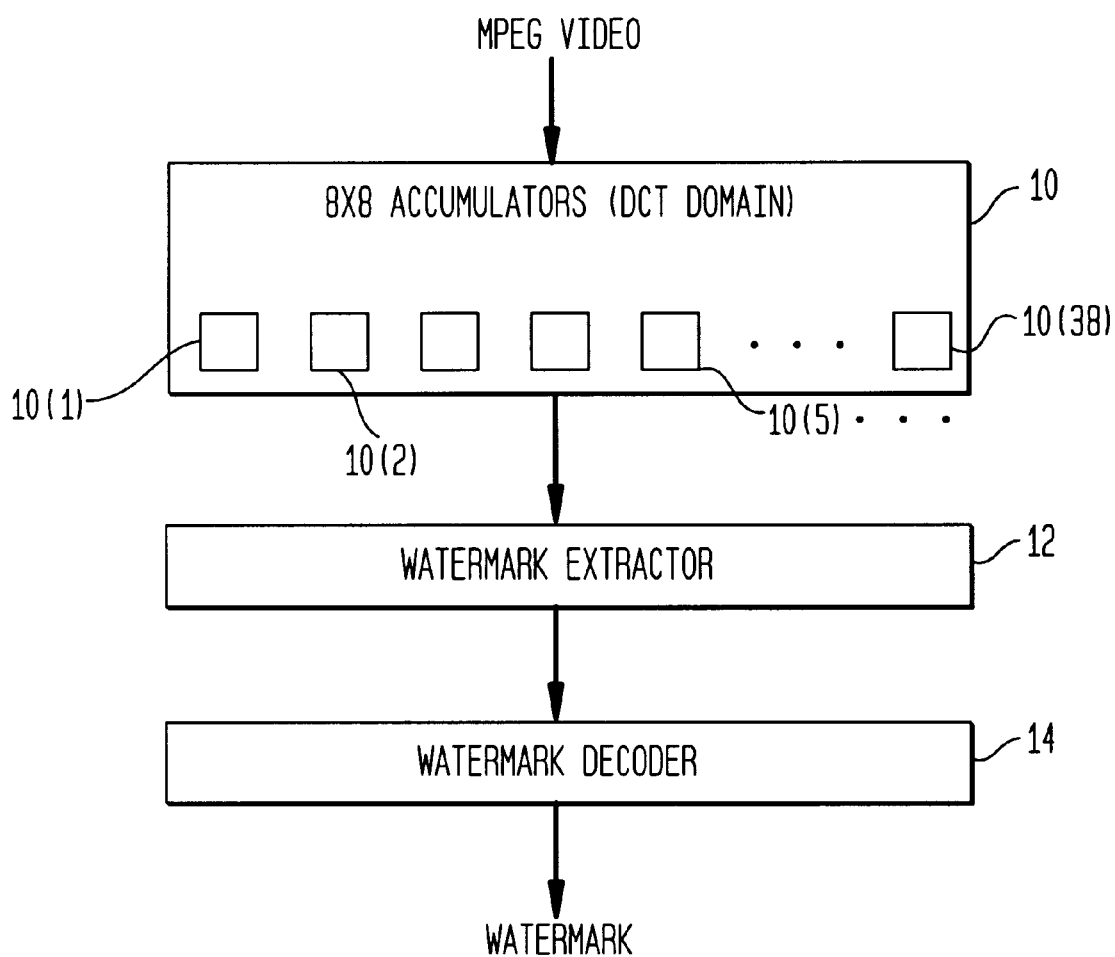
FIG. 1 is a flow diagram of a watermark detection procedure for the case where a stream of compressed video is input.

Referring now to the figures and to FIG. 1 in particular, there is shown a flow diagram of a watermark detection procedure for the case where an MPEG stream of compressed video is input. As each 8×8 block of DCT coefficients is decoded from the input stream, it is added in one of 38-8×8 accumulators 10(1), 10(2) . . . 10(38). After the entire image has been added into the 38-8×8 accumulators, the watermark is extracted from the 38 accumulators resulting groups in a conventional manner 12. The extraction process is simple, requiring only about 500 addition operations. Finally the extracted watermark is decoded 14 and statistically tested to determine if the extracted signal is a real watermark, or merely noise present in an unwatermarked image. If it is determined that a watermark actually is present, the watermark may be decoded to yield information bits necessary for DVD applications. The input video is added to a particular accumulator based on a predetermined mapping relationship used when the watermark was inserted into the video stream.

Figure 2:
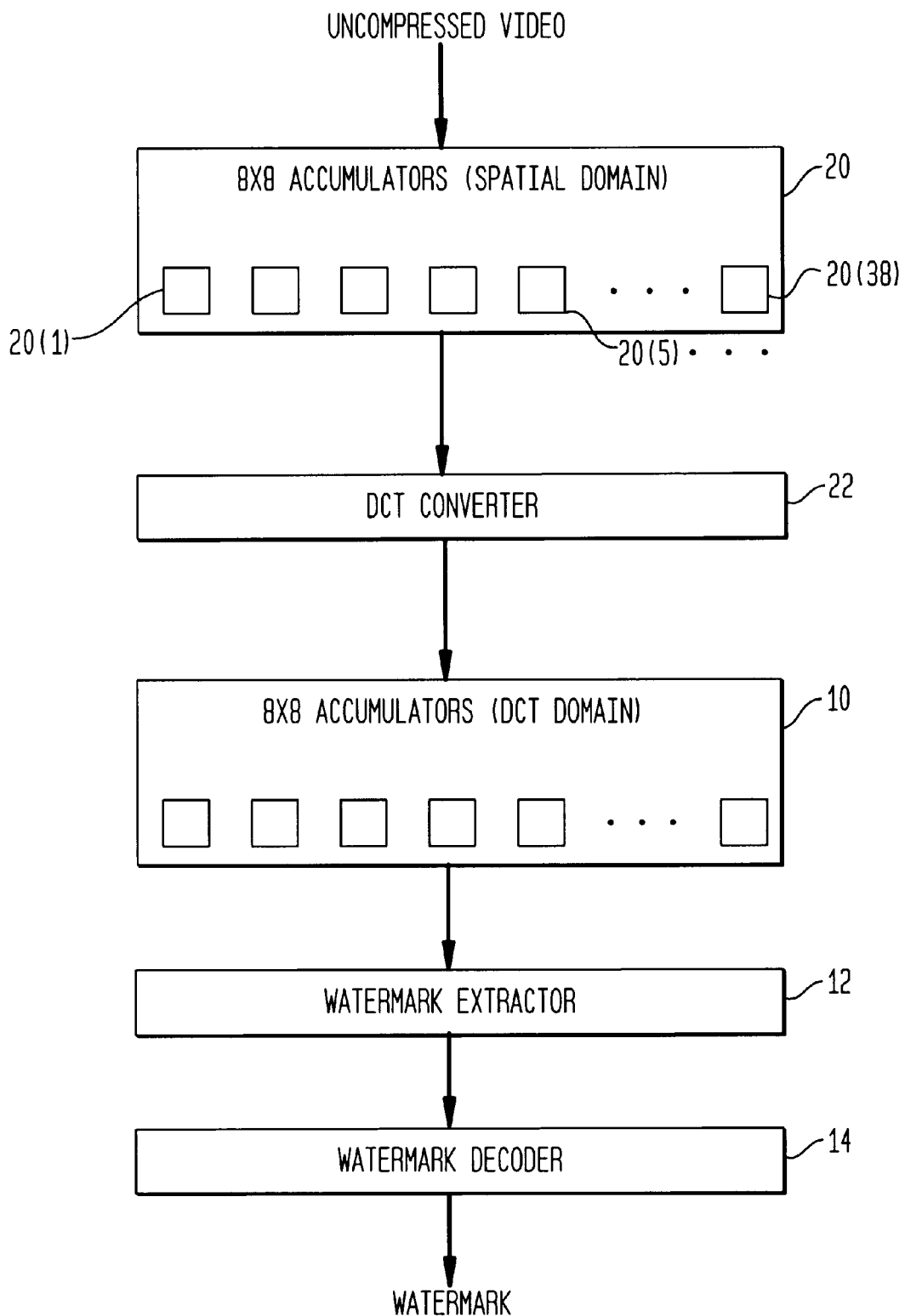
FIG. 2 is a flow diagram of a watermark detection procedure for the case where uncompressed data is the input.

FIG. 2 shows the corresponding watermarking detection procedure for the case where the input is a stream of uncompressed data or uncompressed video. As each pixel arrives, it is added to one of 38-8×8 accumulators 20 according to a predetermined mapping algorithm corresponding to the algorithm used when inserting the watermark into the video. After the entire image has been added into the accumulators, the DCT values of the accumulated video is calculated 22 and the remainder of the watermark decoding process proceeds as described in conjunction with the receipt of MPEG video shown in FIG. 1.

The general methods described above in conjunction with FIGS. 1 and 2 work very well as long as the partitioning of the images into 8×8 blocks during distortion is identical to the partitioning used when the watermark was inserted. However, if the image was subjected to geometric or other affine distortion, the watermark becomes difficult to detect.

Figures 3, 4:
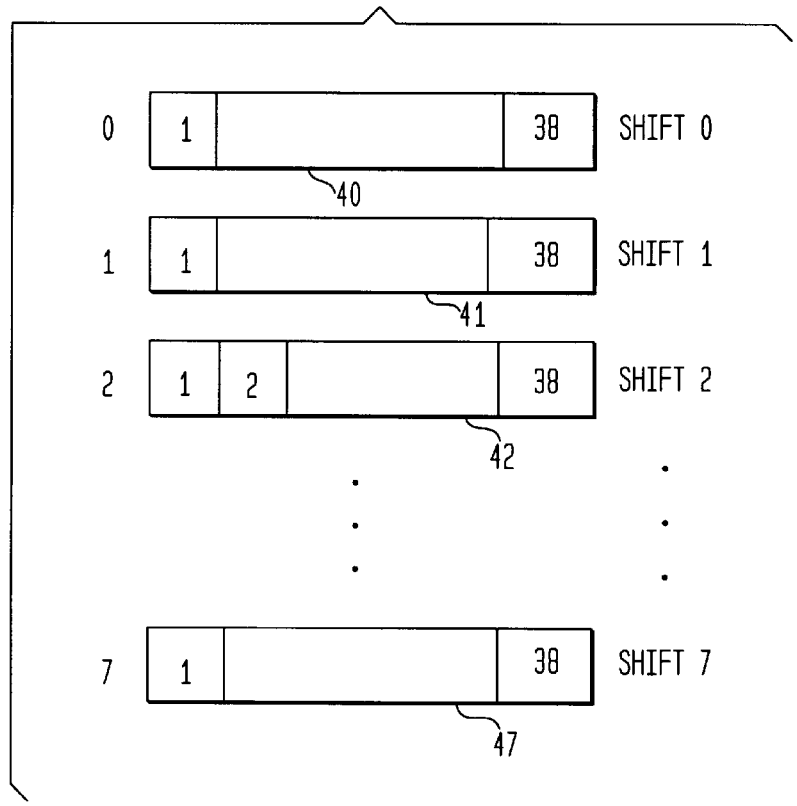
FIG. 3 is a representation of a scaled sequence of blocks relative to an original sequence of blocks.
FIG. 4 is a schematic representation of a set of eight accumulator arrays.

In order to counteract such distortions, the above watermark detection processes are modified. Consider, an image that has been reduced by one-eighth in the horizontal direction. Referring to FIG. 3, the lower row of boxes shows the spatial position of a sequence of 8×8 blocks, 1, 2, 3, . . . 9, in the original image and the upper row of boxes shows the positions of the 8×8 blocks, 1', 2', 3', . . . 10', after the original image has been reduced or scaled by a scale factor. Block 1 in the original image has a strong overlap with block 1' in the scaled image. Block 2 in the original image shares 6 columns of 8×8 pixels with block 2', having been shifted by 1 pixel relative to block 2. Thus, if the columns of block 2' were shifted one column to the right before computation of its DCT, the result would be quite similar to the DCT of the original block 2. The difference between the scaled and original blocks is entirely due to the fact that column 1 of block 2' coincides with column 8 in block 1. This is a source of additional noise for the watermark detector.

Block 1' in the scaled image only differs by a single column of pixels from its corresponding block 1 in the original image. However, Block 5' only has 4 columns in common with block 4 in the original image. Moreover, 4 columns of block 5' are not common to block 4 and 4 columns of block 4 are not common to block 5'. Consequently, block 5' is a very noisy approximation to block 4, even after compensation for the relative shift in translation.

Considered in this manner, scale changes can be approximated by a spatially varying translation of the 8×8 blocks of the scaled image. Therefore the watermark extraction process is modified to achieve this result. The single array of 38 accumulators is replaced by a set of 8 such accumulator arrays for the one-dimension (1-D) horizontal shifts. For two-dimension (2-D) translation, 8×8 or 64 accumulator arrays are necessary. Only 8 arrays are necessary since multiples of 8 result in cyclic shifts of the extracted watermark.

FIG. 4 shows a set of 8 accumulator arrays, each associated with a translation of a predetermined number of columns. During the accumulation phase of the extraction procedure, the 8×8 Block 1' is added to accumulator 1 of set 40, the 8×8 Block 2' is added to accumulator 2 of set 42, Block 3' to accumulator 3 of set 43, and block 4' to accumulator 4 of set 44. Block 5' shares equal amounts of data with both Blocks 4 and 5. Thus Block 5' is added to either accumulator 4 or 5 of set 44 depending upon the rules used to direct the blocks to respective accumulators. Block 6' is added to accumulator 5 of set 45 and so forth. The rules regarding where the blocks are added are a function of the assumed scaling. That is, the accumulators are chosen to provide the necessary spatial translation in order to compensate for the assumed or known scale distortion.

After completing the accumulation of the 8×8 blocks in each accumulator of sets 41 through 47, the summed data are transformed from the DCT domain into the spatial domain and shifted by one column (set 41), two columns (set 42) and so forth, respectively before the spatial domain data is transformed back into the DCT domain. Now, the relative translational shift has been removed and the data in the corresponding accumulators in the set of eight accumulator arrays 40 to 47 are added together to form a single (one-dimension) accumulator array of 38-8×8 blocks. Watermark extraction then proceeds as described above.

Figure 5:
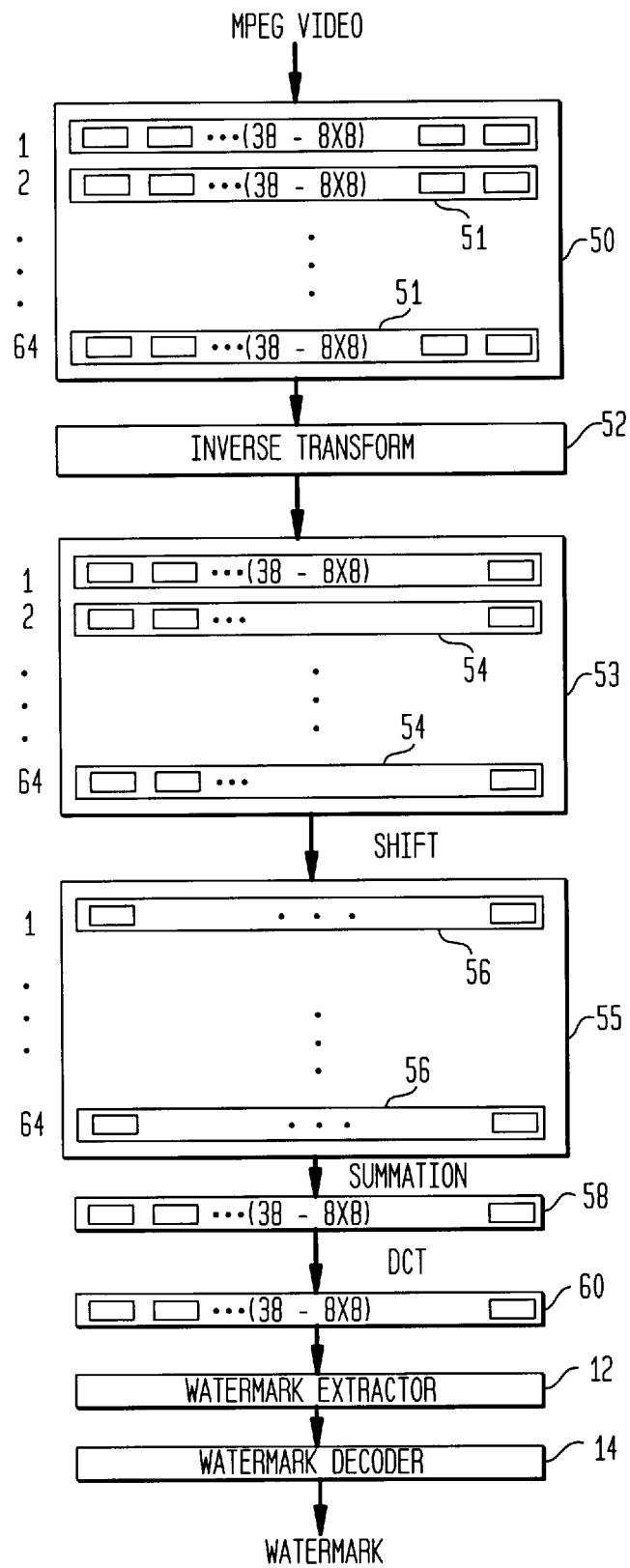
FIG. 5 is a flow diagram of a preferred embodiment of the invention when compressed video is input.
Figure 6:
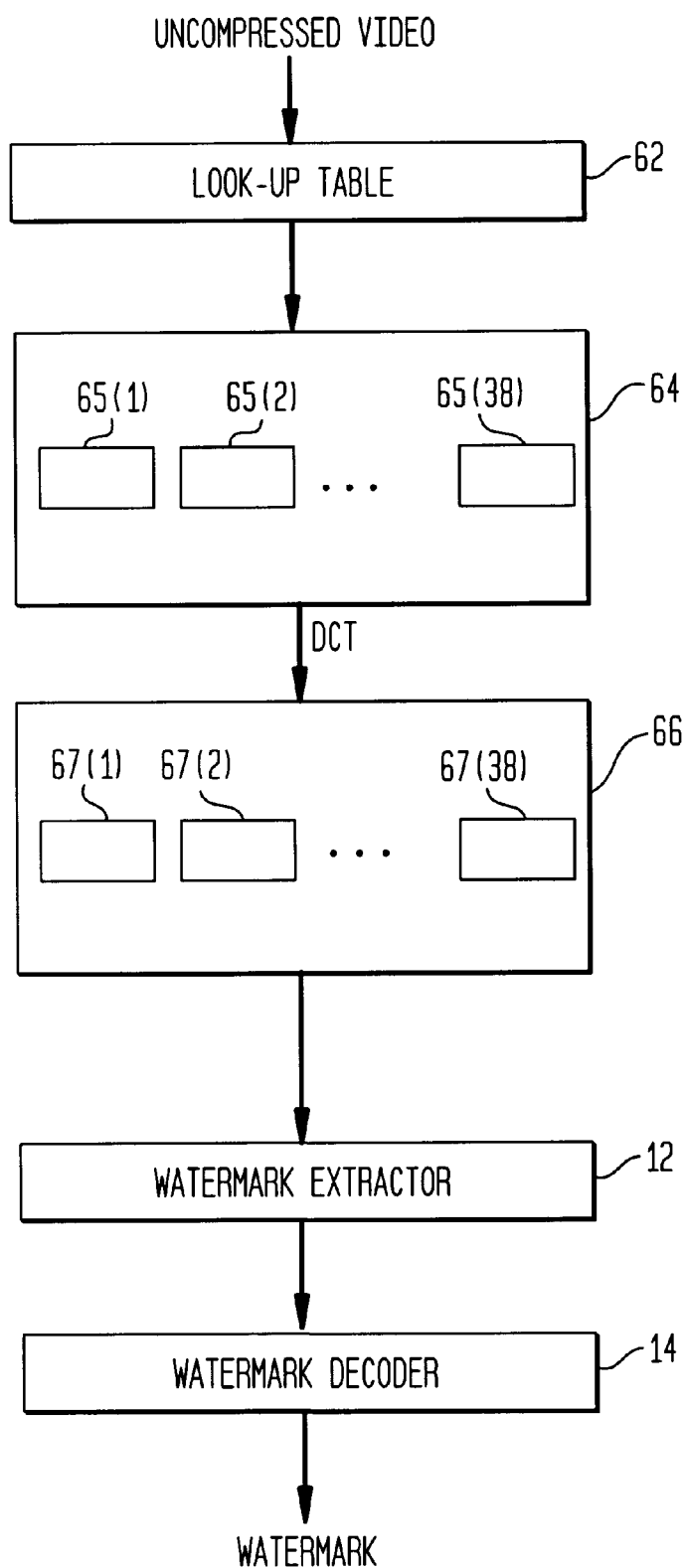
FIG. 6 is a flow diagram of a preferred embodiment of the invention when uncompressed video is input.

FIG. 5 shows the process when compressed video is input and FIG. 6 shows the process when uncompressed video is input.

In FIG. 5, the input compressed video, e.g. MPEG video, is placed into the array 50 of accumulators 51. Each accumulator 51 comprises 38-8×8 blocks. There are 64 such accumulators to compensate for two-dimensional translation. The contents of the 64 accumulators 51 undergo an inverse transform 52 into the spatial domain and are placed into an array 53 of 64 accumulators 54. Each accumulator 54 comprises 38-8×8 blocks. The data in the array 53 undergoes shifting (translation) as described above to compensate for a known or assumed geometric distortion. The shifted data are summed in array 55 comprising 64 accumulators 56. Each accumulator 56, in turn, comprises 38-8×8 blocks of data in the spatial domain. The corresponding blocks in each accumulator 56 are summed together into a one-dimension array of 38-8×8 blocks 58. The summed data is subject to a discrete cosine transform and the DCT values are stored in accumulator array 60. The resulting summed DCT data in the single accumulator 60 of 38-8×8 blocks is subjected to watermark extraction 12 and watermark decoding 14 as described above, in conjunction with FIG. 1.

Experimental tests show that almost equivalent results can be obtained using only data from a subset of the accumulators in array 50, 53, 55, for example, using the data in the shift 0, 1, 6 and 7 accumulator arrays (40, 41, 46 and 47) and disregarding the data in the other accumulators. This results in a significant memory saving. A further improvement is gained by using a coarser quantization of shifts such that the first accumulator array contains data that has been shifted by 0 or 1. Similarly, accumulator array 2 handles shifts of 2, and 3, etc.

In FIG. 6, the uncompressed video is added in an array 64 of 38-8×8 accumulators 65 based on a look-up table 62 that sends the incoming video pixels to a particular accumulator according to a mapping corresponding to the assumed geometric distortion to which the watermark video has been subjected. The summed data in the accumulators 65 are converted into DCT coefficients. The DCT coefficients are summed in a one-dimension array 66 of 38-8×8 block accumulators 67. The data in the accumulator 66 is subjected to watermark extraction and watermark decoding as described above.

While the above description refers to horizontal or column shifts, it will be apparent to those skilled in the art that the same process is equally applicable to vertical or row shifts or to a combination of row and column shifts.

The above example assumed that the reduced scale of the image is known. A different scale requires a different association of scaled blocks to the accumulator arrays. However, this is straightforward to compute.

A further reduction in memory can be achieved by spreading the computation over many frames. In this manner, only a single accumulator array is needed. In frame 0 blocks with shift 0 are accumulated. At the end of frame 0 the accumulator shifts by 1 so that in frame 1, blocks shifted by 1 are accumulated. Thus, after 64 frames, the same result is obtained as earlier, requiring only ¹⁄₆₄ of the memory.

The pseudocode for performing the shifts is as follows:

```
g = "scaling group" (i.e. the number of sets of 38 accumulators used)
sx = 0
sy = 0
For each of g frames
{
    Add ONLY the blocks that must be shifted by sx pixels to the
    right and sy pixels upward into the single set of 8 x 8
    accumulators. Ignore all the other blocks.
    Compute IDCTs on the accumulators.
    Shift the accumulators left one pixel.
    sx = (sx + 1) ÷ 8
    if (sx == 0)
    {
        Shift the accumulators down one pixel.
        sy = (sy + 1) ÷ 8
    }
    Compute DCTs on the accumulators.
}
```

In practice, the scale or geometric distortion is not known, or the scale is not a integer number of columns (or rows), although the range of scales of interest often is known. For example, in video it is assumed that the scale may vary by ±5% and is fixed for the duration of a movie (sequence of video frames), or at least for extended periods of a movie. This latter assumption is reasonable, since if the scale changes frequently, the perceived video quality would be degraded. In these circumstances, a search process must be initiated in which the watermark detector attempts to determine the amount of scaling. For the example of ±5% in both the horizontal and vertical directions, there are 11×11 possible scales, if the scaling is quantized in unit intervals. "Unit intervals" refers to the fact that if the reduction is not ⅛, ¼, ⅜, ½, ⅝, ¾, or ⅞, then the overlap will not coincide with an integer number of rows or columns. In that case, the translational shift will be "rounded" to an integer number of rows or columns. If 2 seconds is needed to detect a watermark at a fixed scale, then 2×121=242 seconds are needed to search all possible scales. This can be considered the worst case latency. In practice, the average latency will be much less, particularly of an intelligent search procedure is used which search most likely scales first.

Scale is not the only geometric distortion that may be approximated by a spatially varying translation of the 8×8 DCT blocks. Other affine transforms can also be handled similarly.

While there has been described and illustrated a preferred solution to watermark detection in multimedia data subject to geometric distortion, it will be apparent to those skilled in the art that variations and modification are possible without deviating from the spirit and teaching of the present invention which shall be limited solely by the broad scope of the claims appended hereto.

What is claimed is:

1. A method for extracting a watermark from compressed data containing a watermark comprising the steps of:
   receiving compressed data containing a watermark in the form of n×n blocks of data subjected to affine geometric distortion;
   spatially translating the blocks according to a spatially varying translation to compensate for an assumed affine geometric distortion; and
   extracting the watermark from the translated blocks of data.

2. A method of extracting a watermark from compressed data containing a watermark comprising the steps of:
   receiving compressed data containing a watermark in the form of 8×8 blocks, which data has been subjected to affine geometric distortion;
   accumulating said blocks in a set of a predetermined number of groups of 8×8 blocks;
   converting the accumulated blocks into spatial domain;
   spatially translating the spatial domain accumulated blocks to compensate for an assumed affine geometric distortion;
   summing the translated blocks; and
   extracting the watermark from the summed translated blocks.

3. A method of extracting a watermark from compressed data containing a watermark as set forth in claim 2, where said extracting the watermark comprises calculating discrete cosine transform values of the summed translated blocks.

4. A method of extracting a watermark from compressed data containing a watermark as set forth in claim 2, where said spatially translating is repeated for different assumed affine geometric distortions, and said extracting the watermark further comprises determining the most statistically significant extracted watermark for the different assumed affine geometric distortions.

5. A method of extracting a watermark from compressed data containing a watermark comprising the steps of:
   receiving compressed data containing a watermark in the form of n×n blocks, which data has been subjected to affine geometric distortion;
   accumulating said blocks in a set of a predetermined number of groups of n×n blocks;
   converting the accumulated blocks into spatial domain;
   spatially translating the spatial domain accumulated blocks to compensate for an assumed affine geometric distortion;

summing the translated blocks; and extracting the watermark from the summed translated blocks.

6. A method of extracting a watermark from compressed data containing a watermark as set forth in claim 5, where said extracting the watermark comprises calculating discrete cosine transform values of the translated blocks.

7. A method of extracting a watermark from compressed data containing a watermark as set forth in claim 5, where said spatially translating is repeated for different assumed affine geometric distortions, and said extracting the watermark further comprises determining the most statistically significant extracted watermark for the different assumed affine geometric distortions.

8. A method of extracting a watermark from compressed data containing a watermark as set forth in claim 5, where the value of n is 8.

9. A method for extracting a watermark from data containing a watermark comprising the steps of:

receiving data containing a watermark, which data has been subjected to affine geometric distortion;

accumulating said data as n×n blocks of data;

spatially translating the blocks of data to compensate for affine geometric distortion;

performing DCT transformation of said n×n blocks of data; and extracting the watermark from the translated blocks of transformed data.

10. A method for extracting a watermark from data containing a watermark as set forth in claim 9, where the value of n is 8.

11. A method for extracting a watermark from data containing a watermark comprising the steps of:

receiving data containing a watermark, which data has been subjected to affine geometric distortion;

accumulating said data into a predetermined number of n×n accumulated blocks of data according to a mapping algorithm of an assumed affine geometric distortion; and extracting the watermark from the accumulated blocks of data.

12. A method for extracting a watermark from data containing a watermark as set forth in claim 11, where said mapping algorithm comprises a lookup table.

13. A method for extracting a watermark from data containing a watermark as set forth in claim 11, where the value of n is 8.

14. A method for extracting a watermark from data containing a watermark as set forth in claim 11, further comprising performing DCT transformation of said n×n accumulated blocks of data and said extracting the watermark from the DCT transformed n×n accumulated blocks of data.

15. A method for extracting a watermark from data containing a watermark as set forth in claim 14, where said mapping algorithm comprises a lookup table.

16. A method of extracting a watermark from compressed data containing a watermark comprising the steps of:

receiving compressed data containing a watermark in the form of n×n blocks, which data has been subjected to affine geometric distortion;

accumulating said blocks into a set of a predetermined number of groups of n×n accumulated blocks according to a mapping algorithm of an assumed affine geometric distortion; and extracting the watermark from the accumulated blocks.

17. A method of extracting a watermark from compressed data containing a watermark as set forth in claim 16, where said accumulating said blocks is repeated for different assumed affine geometric distortions, and said extracting the watermark further comprises determining the most statistically significant extracted watermark for the different assumed affine geometric distortions.

18. A method of extracting a watermark from compressed data containing a watermark as set forth in claim 16, where the value of n is 8.

19. A method of extracting a watermark from compressed data containing a watermark as set forth in claim 16, where said extracting the watermark comprises:

converting the accumulated blocks into spatial domain;

spatially translating the spatial domain of each accumulated block in each group by an associated translational shift; and summing the translated blocks in each group to obtain a set of summed blocks, and said extracting the watermark extracts the watermark from the set of summed blocks.

20. A method of extracting a watermark from compressed data containing a watermark as set forth in claim 19, where said accumulating said blocks is repeated for different assumed affine geometric distortions, and said extracting the watermark further comprises determining the most statistically significant extracted watermark for the different assumed affine geometric distortions.

21. A method of extracting a watermark from compressed data containing a watermark as set forth in claim 19, where the value of n is 8.

22. A method of extracting a watermark from compressed data containing a watermark as set forth in claim 19, further comprising performing a translational search of the summed blocks to find the translation that results in the most statistically significant watermark being extracted and extracting the watermark from the translated blocks yielding the most statistically significant watermark.

23. A method of extracting a watermark from compressed data containing a watermark as set forth in claim 22, where said extracting the watermark comprises calculating discrete cosine transform values of the accumulated blocks.

24. A method of extracting a watermark from compressed data containing a watermark as set forth in claim 23, where said accumulating said blocks is repeated for different assumed affine geometric distortions, and said extracting the watermark further comprises determining the most statistically significant extracted watermark for the different assumed affine geometric distortions.

* * * * *